US011181088B2

(12) United States Patent
Kida et al.

(10) Patent No.: US 11,181,088 B2
(45) Date of Patent: Nov. 23, 2021

(54) INTERNAL-COMBUSTION ENGINE STARTING DEVICE

(71) Applicant: Mitsubishi Electric Corporation, Tokyo (JP)

(72) Inventors: Junji Kida, Tokyo (JP); Kazuhiro Odahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/651,817

(22) PCT Filed: Mar. 29, 2018

(86) PCT No.: PCT/JP2018/013196
§ 371 (c)(1),
(2) Date: Mar. 27, 2020

(87) PCT Pub. No.: WO2019/123671
PCT Pub. Date: Jun. 27, 2019

(65) Prior Publication Data
US 2020/0248665 A1    Aug. 6, 2020

(30) Foreign Application Priority Data

Dec. 18, 2017   (JP) .............................. JP2017-241588

(51) Int. Cl.
*F02N 15/02*      (2006.01)
*F02N 11/08*      (2006.01)
(Continued)

(52) U.S. Cl.
CPC ............ *F02N 15/02* (2013.01); *F02N 11/087* (2013.01); *F16F 15/08* (2013.01); *F16H 1/28* (2013.01)

(58) Field of Classification Search
CPC ........ F02N 11/00; F02N 11/087; F02N 15/02; F02N 15/046; F02N 15/067
See application file for complete search history.

(56) References Cited

U.S. PATENT DOCUMENTS 3,583,825 A * 6/1971 Sadler ...................... F16H 1/28
                                                  415/124.2
4,503,719 A * 3/1985 Hamano ............... F02N 15/046
                                                  475/347
(Continued)

FOREIGN PATENT DOCUMENTS

CN         103603762 A       2/2014
DE   10 2010 062 692 A1      6/2012
(Continued)

OTHER PUBLICATIONS

International Search Report of PCT/JP2018/013196 dated Jun. 19, 2018 [PCT/ISA/210].
(Continued)

*Primary Examiner* — Carl C Staubach
(74) *Attorney, Agent, or Firm* — Sughrue Mion, PLLC; Richard C. Turner (57) ABSTRACT

An internal-combustion engine starting device includes a switch section, a motor section, a transmission mechanism section, and a pinion gear section, wherein the transmission mechanism section is configured of a planetary gear train including a pinion which is connected to the rotating shaft of the motor section, a plurality of planetary gears to which the rotation of the pinion is transmitted, and an internal gear which receives the rotation of the planetary gears; and of a machine casing in which is housed the planetary gear train, and wherein elastic bodies are each fitted between a protruding portion formed on the outer peripheral surface of the internal gear and a recessed portion in which to receive the (Continued)

protruding portion, and clearances are formed between the internal gear and the machine casing via the elastic bodies.

20 Claims, 12 Drawing Sheets

(51) Int. Cl.
*F16F 15/08* (2006.01)
*F16H 1/28* (2006.01)

(56) References Cited

U.S. PATENT DOCUMENTS

| | | | | |
|---|---|---|---|---|
| 4,561,316 | A * | 12/1985 | Bolz | F02N 15/06 475/149 |
| 2002/0135186 | A1 * | 9/2002 | Chane-Waye | F02N 15/046 290/38 R |
| 2003/0177852 | A1 * | 9/2003 | Kim | F02N 15/046 74/6 |
| 2003/0200826 | A1 * | 10/2003 | Oomura | F02N 15/046 74/7 E |
| 2004/0123686 | A1 * | 7/2004 | Kajino | F02N 15/063 74/7 E |
| 2004/0255704 | A1 * | 12/2004 | Liu | F16H 57/08 74/7 E |
| 2005/0028619 | A1 * | 2/2005 | Chane-Waye | F16D 3/68 74/7 E |
| 2006/0060009 | A1 | 3/2006 | Oomura et al. | |
| 2008/0184845 | A1 * | 8/2008 | Farrar | F02N 15/046 74/7 E |
| 2011/0094333 | A1 * | 4/2011 | Chane-Waye | F02N 15/046 74/7 E |
| 2016/0061174 | A1 * | 3/2016 | Bauer | F02N 15/046 74/6 |

FOREIGN PATENT DOCUMENTS

| | | |
|---|---|---|
| DE | 10 2014 217 349 A1 | 3/2016 |
| EP | 1 357 287 A2 | 10/2003 |
| EP | 2 677 162 A2 | 12/2013 |
| JP | 59-23065 A | 2/1984 |
| JP | 61-61353 U | 4/1986 |
| JP | 61-192569 U | 11/1986 |
| JP | 2001-065442 A | 3/2001 |
| JP | 2004-060520 A | 2/2004 |
| KR | 10-2011-0072188 A | 6/2011 |
| WO | 2017/178759 A1 | 10/2017 |

OTHER PUBLICATIONS

Extended European Search Report dated Jan. 14, 2021 in European Application No. 18891964.1.
Communication dated Mar. 17, 2021, from the Intellectual Property Office of India in application No. 202027012236.
Communication dated Jul. 27, 2021 by the Chinese Patent Office in Chinese Application No. English 201880079817.9.

* cited by examiner

INTERNAL-COMBUSTION ENGINE STARTING DEVICE

CROSS REFERENCE TO RELATED APPLICATIONS

This application is a National Stage of International Application No. PCT/JP2018/013196, filed Mar. 29, 2018, claiming priority to Japanese Patent Application No. 2017-241588, filed Dec. 18, 2017.

TECHNICAL FIELD

The present application relates to the field of an internal-combustion engine starting device.

BACKGROUND ART

As an internal-combustion engine starting device, heretofore, a starting device has been developed wherein parts which transmit the torque of the starting device are prevented from being damaged by a compression and a decompression shock of an internal-combustion engine when starting. For example, in a starting device described in PTL 1, a buffer member is provided in a transmission mechanism section of the starting device, thereby attenuating the peak of impact force acting on the starting device, preventing damage to the starting device.

Also, in a starting device described in PTL 2, a configuration is such that a wide range of impact forces is absorbed and mitigated by using a plurality of buffer members with different elasticities.

CITATION LIST

Patent Literature

PTL 1: JP-A-59-23065
PTL 2: JP-UM-A-61-61353

SUMMARY OF INVENTION

Technical Problem

However, the internal-combustion engine starting devices of PTL 1 and PTL 2 have the following disadvantage: there is an imbalance in precision or strength between component parts of the transmission mechanism section, so that deformation or eccentricity occurs due to an impact force generated when the internal-combustion engine starts, as a result of which the machine casing of a starting motor and the parts of the transmission mechanism section hit each other, thereby leading to a decrease in impact mitigation effect and thus to abnormal noise generation.

The present application discloses a technology for solving the above problem and provides an internal-combustion engine starting device wherein it is possible to mitigate an impact force generated when an internal-combustion engine starts and thus to reduce noise when starting.

Solution to Problem

The internal-combustion engine starting device disclosed in the present application includes a switch section having a switch which is closed by a moving contact moving and being connected to a fixed contact by energization; a motor section which operates by being energized by the closure of the switch; a transmission mechanism section which reduces the rotation speed of the motor section; and a pinion gear section which has a pinion gear, which is caused to move axially by operation of the switch section and to which the output of the transmission mechanism section is transmitted, and which thus causes the pinion gear to engage with a ring gear connected to an internal-combustion engine, wherein the transmission mechanism section is configured of a planetary gear train including a pinion which is connected to the rotating shaft of the motor section, a plurality of planetary gears to which the rotation of the pinion is transmitted, and an internal gear which receives the rotation of the planetary gears; and of a machine casing in which is housed the planetary gear train, and wherein elastic bodies are each fitted between a protruding portion formed on the outer peripheral surface of the internal gear and a recessed portion in which to receive the protruding portion, and clearances are formed between the internal gear and the machine casing via the elastic bodies.

Advantageous Effects of Invention

According to the internal-combustion engine starting device disclosed in the present application, the elastic bodies are disposed between the internal gear in the transmission mechanism section and the machine casing of the starting device, and thereby it is possible to mitigate an impact force generated in the transmission mechanism section when starting and thus to reduce noise when starting.

DESCRIPTION OF EMBODIMENTS

First Embodiment

Figure 1:
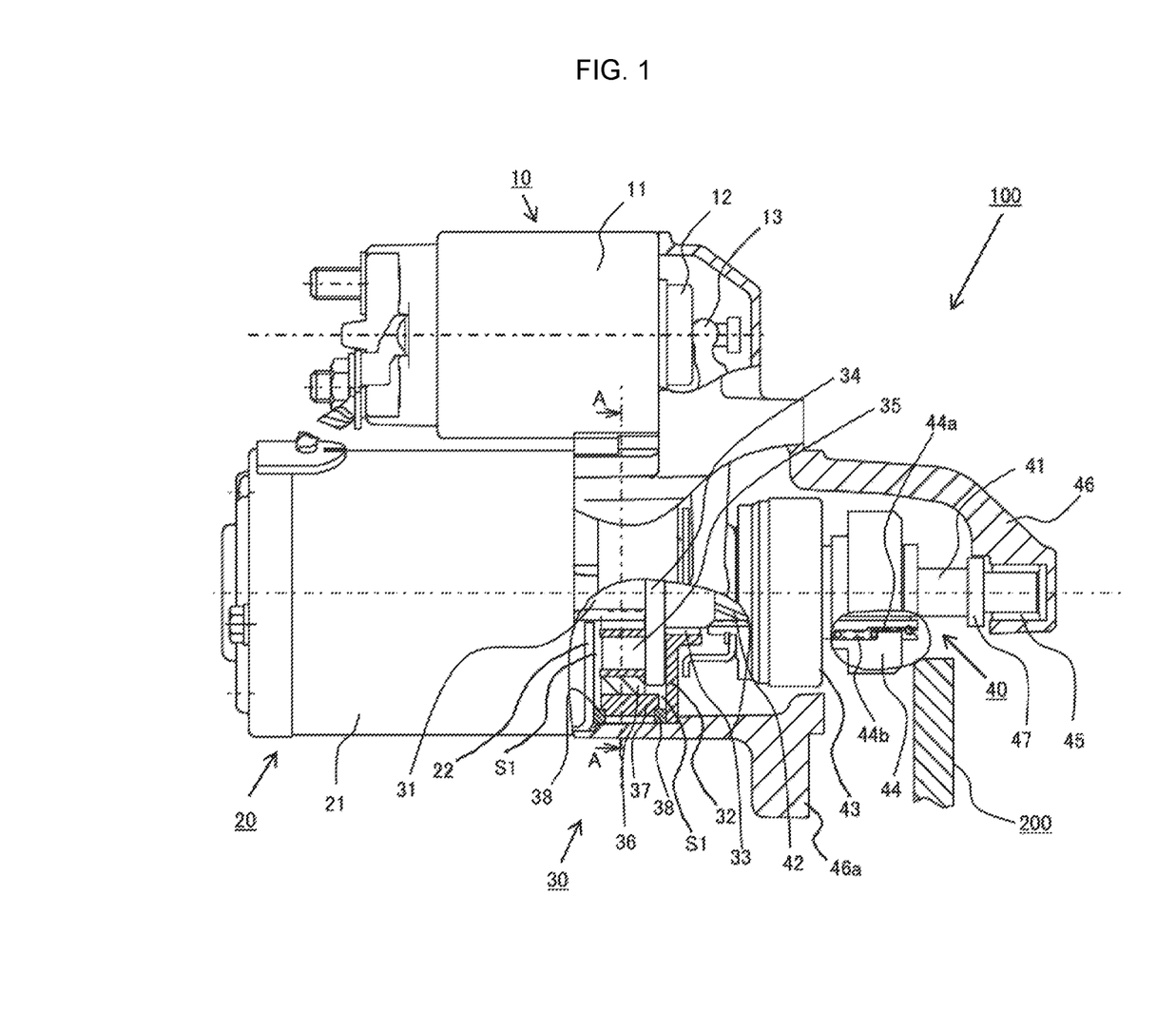
FIG. 1 is a partial sectional view showing a configuration of an internal-combustion engine starting device according to the first embodiment.

FIG. 1 is a partial sectional view showing a configuration of an internal-combustion engine starting device according to the first embodiment.

In the drawing, a starting device 100, which rotationally drives a ring gear 200 connected to an internal-combustion engine, is configured of a switch section 10, a motor section 20, a transmission mechanism section 30, and an output section 40.

Here, the switch section 10 includes a machine casing 11 in which is housed a switch formed of a solenoid, a fixed contact, and a moving contact which are not shown, a plunger 12 which is attracted by energizing the solenoid, and a lever 13 which is pivoted by the plunger 12.

Also, the motor section 20 is energized by closing the fixed and moving contacts of the switch section 10, thus rotationally driving the shaft of the motor section 20, wherein a yoke 21 which configures a magnetic path and forms the machine casing of the starting device 100 is provided on the outer periphery of the motor section 20, and a partition wall 22 which separates the motor section 20 from the transmission mechanism section 30 is provided in the axially leading end portion of the yoke 21.

The output section 40 includes an output shaft 41, a one-way clutch 43 which is configured so as to be movable along the output shaft 41 via a spline 42 as the lever 13 pivots and which is rotatably attached thereto, a pinion gear 44 which is connected to the one-way clutch 43 and which is caused to move axially together with the one-way clutch 43 and engages with the ring gear 200, a bracket 46 which configures the machine casing of the starting device 100 and which supports the leading end portion of the output shaft 41 via a bearing 45, and a stopper 47 which regulates an axial movement of the pinion gear 44.

The pinion gear 44 is axially movably disposed via a serration 44a and is biased in the direction of the ring gear 200 by an elastic member 44b.

Next, a detailed description will be given of the transmission mechanism section 30 which is a main portion of the starting device in the first embodiment.

Figure 2:
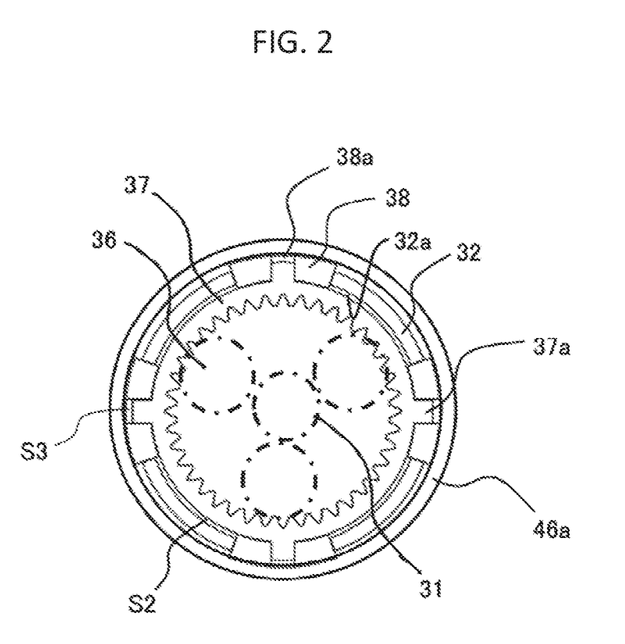
FIG. 2 is a main portion schematic diagram showing a cross section along the line A-A in FIG. 1.
Figure 3:
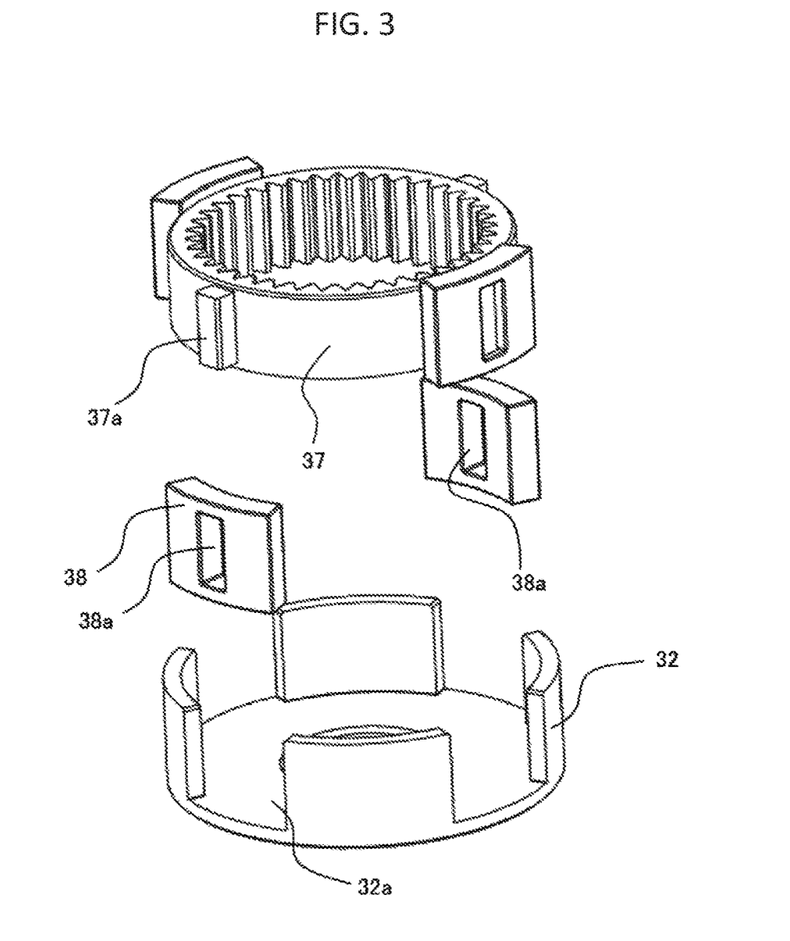
FIG. 3 is a schematic diagram showing in development the main portion configuration in FIG. 2.

FIG. 2 is a main portion schematic diagram showing a cross section along the line A-A in FIG. 1, and FIG. 3 is a schematic diagram showing in development the main portion configuration in FIG. 2.

As shown in the drawings, the transmission mechanism section 30, being configured of a planetary gear train, is configured including a pinion 31 which is formed at the leading end of the rotating shaft of the motor section 20, a bracket 32 which is attached to the bracket 46 and which separates the transmission mechanism section 30 from the output section 40, a flange 34 which is rotatably supported via a bearing 33 by the bracket 32, shafts 35 which are installed protruding axially from the flange 34, a plurality of planetary gears 36 which are rotatably attached one to each of the shafts 35 and which are rotationally driven in engagement with the pinion 31, an internal gear 37 which engages with the planetary gears 36, and elastic bodies 38 which are inserted between the machine casing of the transmission mechanism section 30 and the internal gear 37.

The machine casing of the transmission mechanism section 30, which covers the planetary gears train, is configured by the partition wall 22, which separates the transmission mechanism section 30 from the motor section 20, and the brackets 32 and 46.

Here, a plurality of protruding portions 37a are formed at regular intervals on the outer periphery of the internal gear 37, and the protruding portions 37a are fitted in through holes 38a formed in the elastic bodies 38, respectively. Also, recessed portions 32a in which to hold the respective elastic bodies 38 are provided in the bracket 32.

Consequently, the internal gear 37 is supported by the elastic bodies 38 with an axial clearance S1 being formed between the internal gear 37 and the partition wall 22, a radial clearance S2 being formed between the internal gear 37 and the bracket 32, and a radial clearance S3 being formed between the internal gear 37 and the bracket 46.

The pinion 31, the planetary gears 36, and the bracket 46 are omitted from being shown in FIG. 3.

Next, a description will be given of an operation of the internal-combustion engine starting device 100 as heretofore described.

First, when the solenoid of the switch section 10 is energized upon starting, the plunger 12 is attracted and moves to the left side of FIG. 1, pivoting the lever 13 engaged with the plunger 12. Along with this, the one-way clutch 43 is pushed out in the right direction, causing the pinion gear 44 to abut against the ring gear 200 with the elastic force of the elastic member 44b.

After that, when the built-in moving contact of the switch section 10 is connected to the built-in fixed contact thereof, energizing the motor section 20, the pinion gear 44, while rotating, slides on the tooth surface of the ring gear 200, moves in the right direction, and engages with the ring gear 200. The pinion gear 44 is locked by the stopper 47 and never moves beyond the ring gear 200.

As a result, the rotation torque of the motor section 20 is amplified via the transmission mechanism section 30 and transmitted to the ring gear 200 via the output shaft 41 and pinion gear 44, starting the internal-combustion engine.

In the meantime, when transmitting the rotation torque of the motor section 20 to the output section 40, an off-axis deviation of or a deformation of the internal gear 37 occurs in the transmission mechanism section 30 due to the imbalance in precision between component parts of the transmission mechanism section 30 or to the imbalance between the forces acting on the component parts, but the predetermined clearances S1, S2, S3 are provided between the internal gear 37 and the machine casing of the transmission mechanism section 30, thereby not inhibiting the behavior of the internal gear 37, and the internal gear 37 is supported by the machine casing of the transmission mechanism section 30 with the elastic bodies 38 intervened therebetween, so that vibration occurring in the transmission mechanism section 30 can be attenuated by the elastic bodies 38.

When the range of axial movement due to an inclination, an axial displacement, an assembly clearance, or the like, of the internal gear 37 when in operation is taken as ΔL, the axial clearance S1 between the partition wall 22 and bracket 32, which form the machine casing of the transmission mechanism section 30, and the internal gear 37 is set to be S1>ΔL. Also, when a gear clearance (a backlash, a clearance between the tooth tip of one gear and the tooth root of its mate) and the range of radial movement due to a deformation or an eccentricity of the internal gear 37 are taken as ΔR (the range of movement ΔR is generally taken to be the gear clearance), the radial clearance S2 between the bracket 32 and the internal gear 37 and the radial clearance S3 between the bracket 46 and the internal gear 37 are, respectively, set to be S2>ΔR and S3>ΔR.

As above, the axial clearance S1 and radial clearances S2 and S3 between the machine casing of the transmission mechanism section 30 and the internal gear 37 are secured by the elastic bodies 38, and thereby it is possible to suppress vibration transmission to the machine casing of the transmission mechanism section 30, and thus possible to reduce noise when starting.

Second Embodiment

Figure 4:
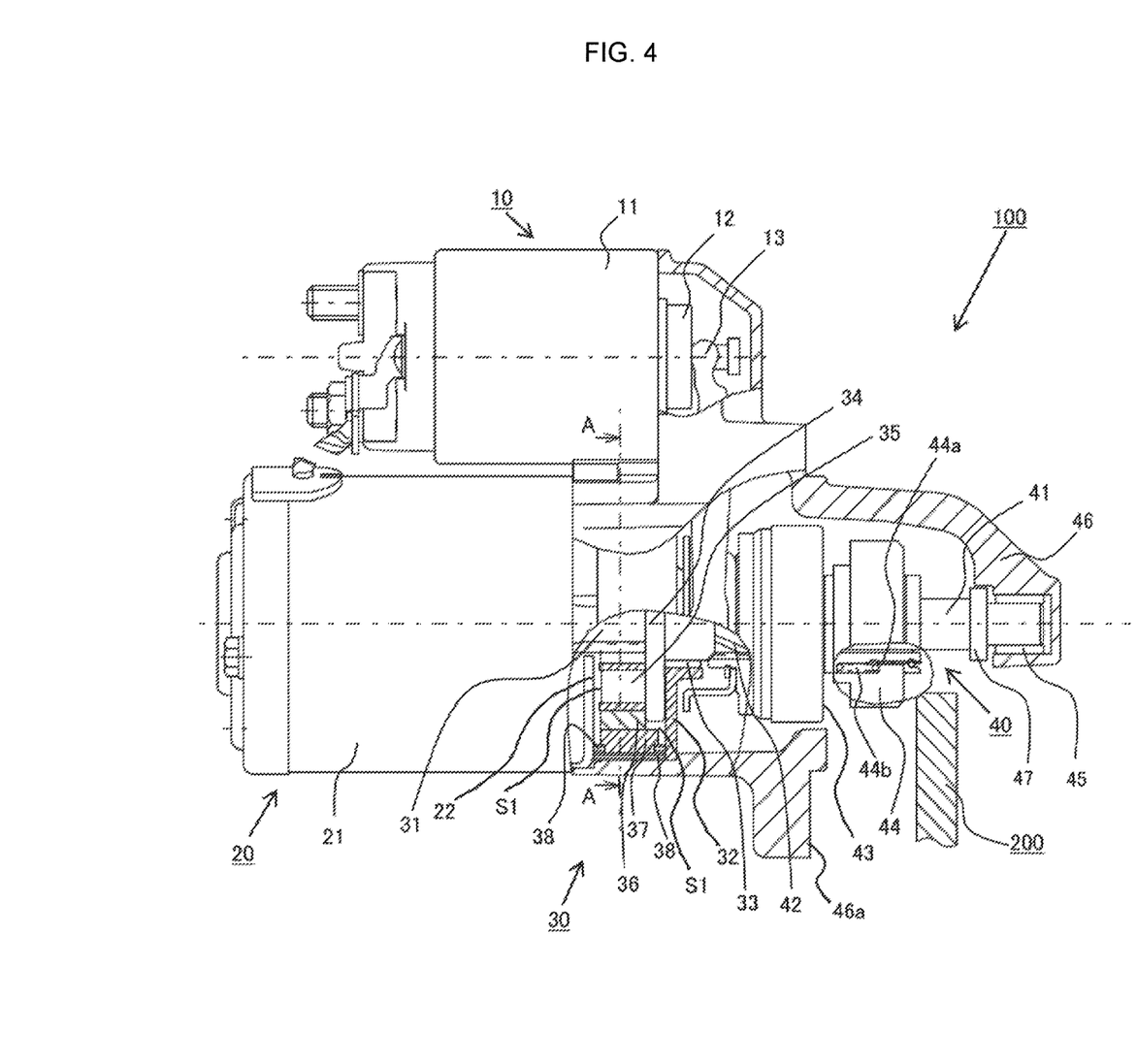
FIG. 4 is a partial sectional view showing a configuration of an internal-combustion engine starting device according to the second embodiment.
Figure 5:
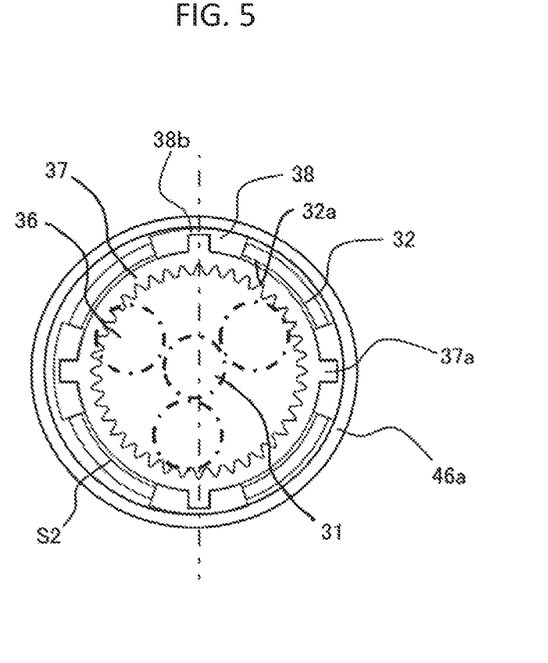
FIG. 5 is a main portion schematic diagram showing a cross section along the line A-A in FIG. 4.
Figure 6:
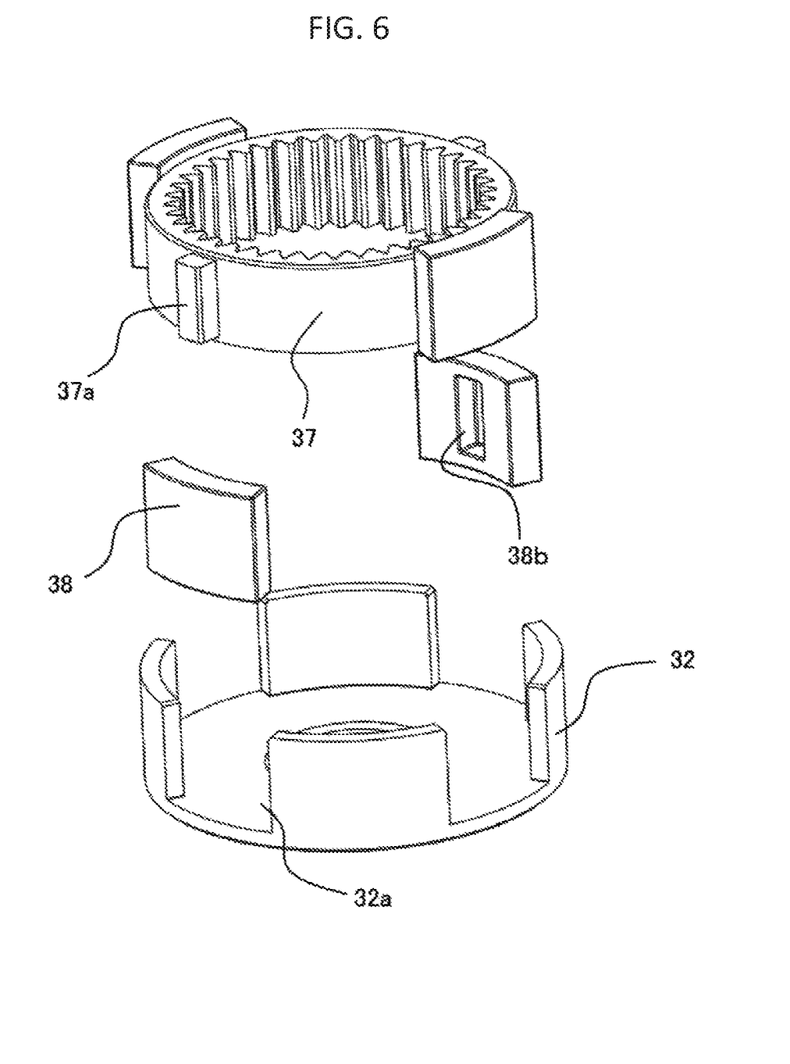
FIG. 6 is a schematic diagram showing in development the main portion configuration in FIG. 5.

FIG. 4 is a partial sectional view showing a configuration of an internal-combustion engine starting device according to the second embodiment, FIG. 5 is a main portion schematic diagram showing a cross section along the line A-A in FIG. 4, and FIG. 6 is a schematic diagram showing in development the main portion configuration in FIG. 5.

In the drawings, portions identical or equivalent to those of the configuration of the first embodiment shown in FIGS. 1 to 3 are given the identical signs, omitting the description.

In the first embodiment, the through holes 38a are provided one in each of the elastic bodies 38 and configured to receive the respective protruding portions 37a of the internal gear 37, but in the second embodiment, non-through holes 38b, the respective outer peripheral side ends of which in the elastic bodies 38 are closed, are provided, configuring recessed portions in which to receive the respective protruding portions 37a of the internal gear 37.

By adopting this kind of configuration, it is possible, in the same way as in the first embodiment, to suppress vibration to be transmitted to the machine casing of the transmission mechanism section 30 from the internal gear 37, and thus to reduce noise when starting.

The radial thickness of the bottom surface of the non-through hole 38b in each of the elastic bodies 38 may be smaller than the range of movement ΔR of the internal gear 37, and in this case, the protruding portions 37a of the internal gear 37 do not abut directly against the inner peripheral surface of the bracket 32, so that it is possible to similarly obtain the advantageous effect of noise reduction.

Third Embodiment

Figure 7:
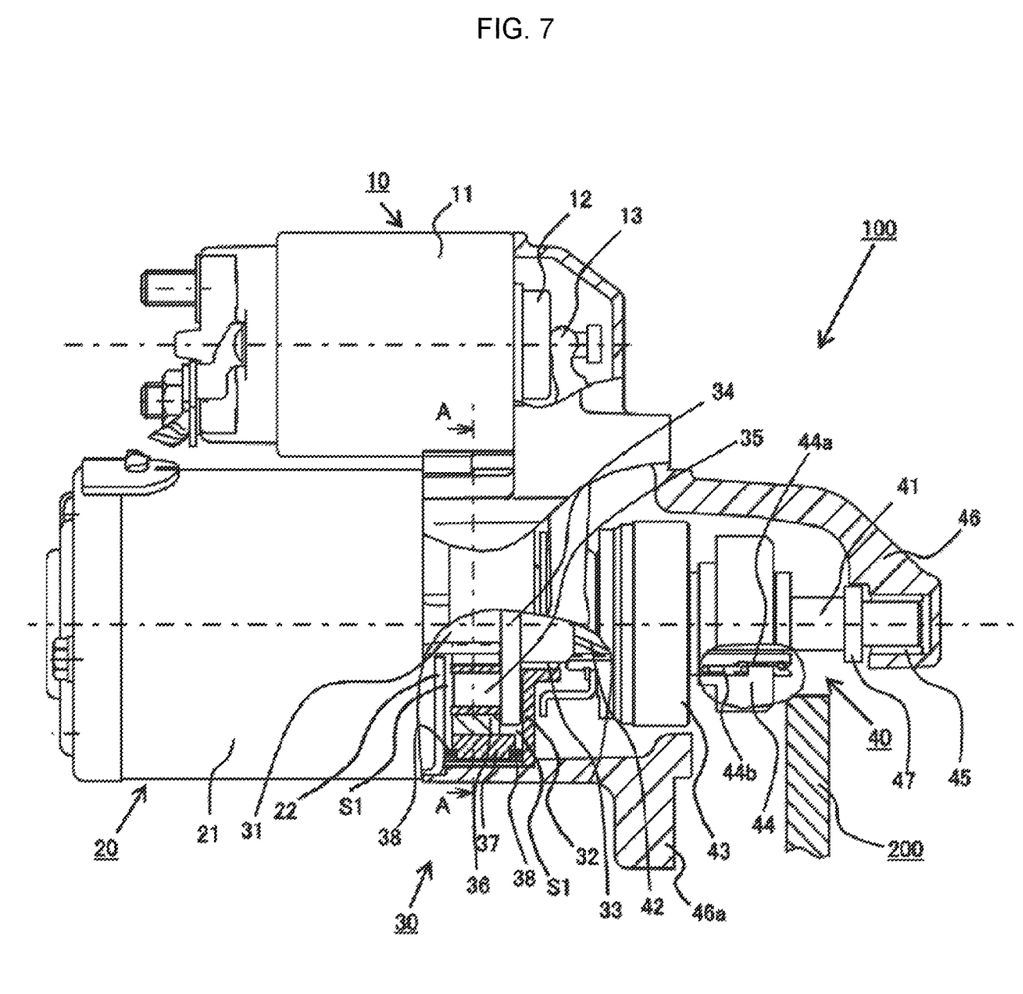
FIG. 7 is a partial sectional view showing a configuration of an internal-combustion engine starting device according to the third embodiment.
Figure 8:
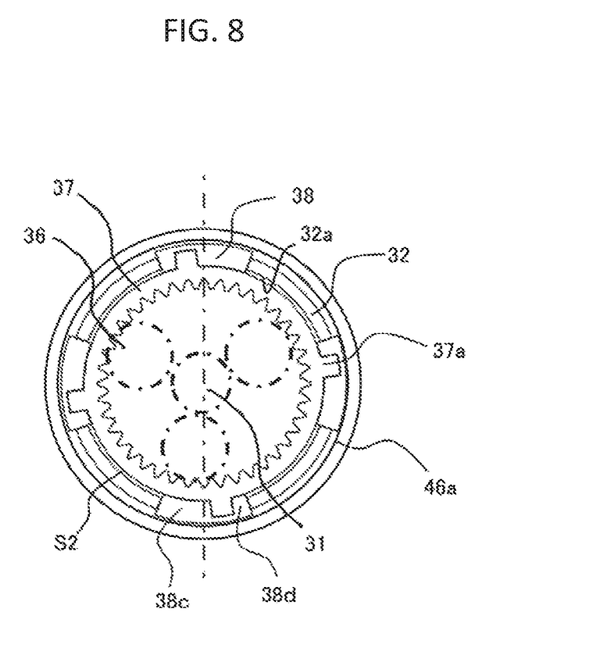
FIG. 8 is a main portion schematic diagram showing a cross section along the line A-A in FIG. 7.
Figure 9:
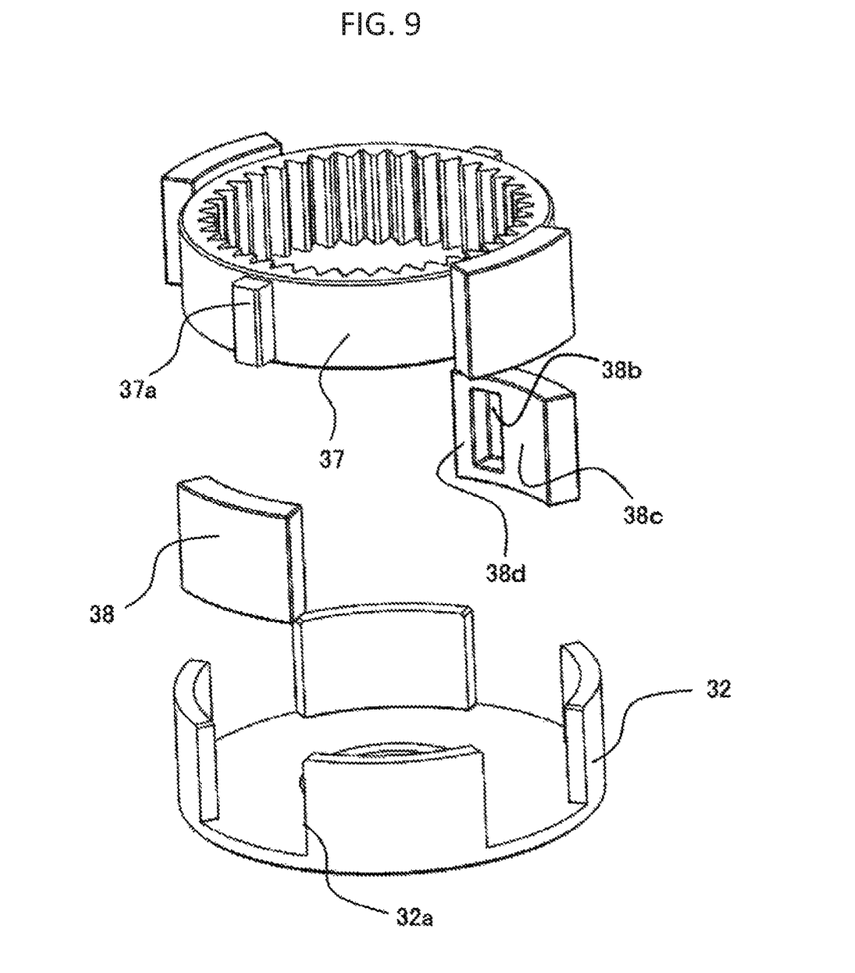
FIG. 9 is a schematic diagram showing in development the main portion configuration in FIG. 8.

FIG. 7 is a partial sectional view showing a configuration of an internal-combustion engine starting device according to the third embodiment, FIG. 8 is a main portion schematic diagram showing a cross section along the line A-A in FIG. 7, and FIG. 9 is a schematic diagram showing in development the main portion configuration in FIG. 8.

In the drawings, portions identical or equivalent to those of the configuration of the second embodiment shown in FIGS. 4 to 6 are given the identical signs, omitting the description.

In the heretofore described second embodiment, the non-though holes 38b are provided one in the central portion of each of the elastic bodies 38 and configured to receive the respective protruding portions 37a of the internal gear 37, but in the third embodiment, the circumferential length of one side 38c of each of the elastic bodies 38, which side is subjected to a reaction force generated when transmitting a rotary torque to the internal-combustion engine, is formed to be larger than that of the other side 38d.

By adopting this kind of configuration, it is possible to reduce the torsional rigidity of the starting device on the torque transmission side, and so possible to improve the advantageous effect of mitigating the impact at the time of torque transmission.

Fourth Embodiment

Figure 10:
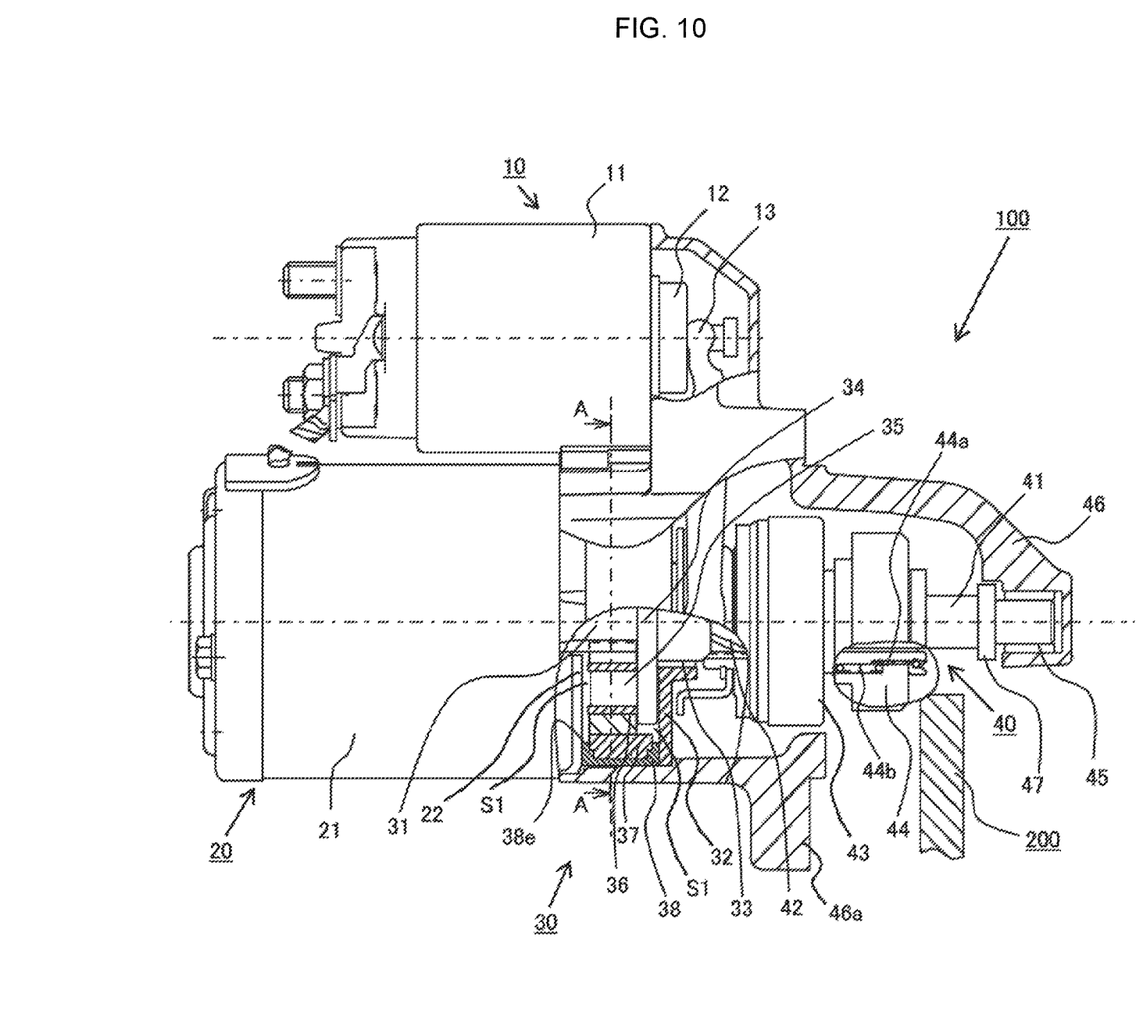
FIG. 10 is a partial sectional view showing a configuration of an internal-combustion engine starting device according to the fourth embodiment.
Figure 11:
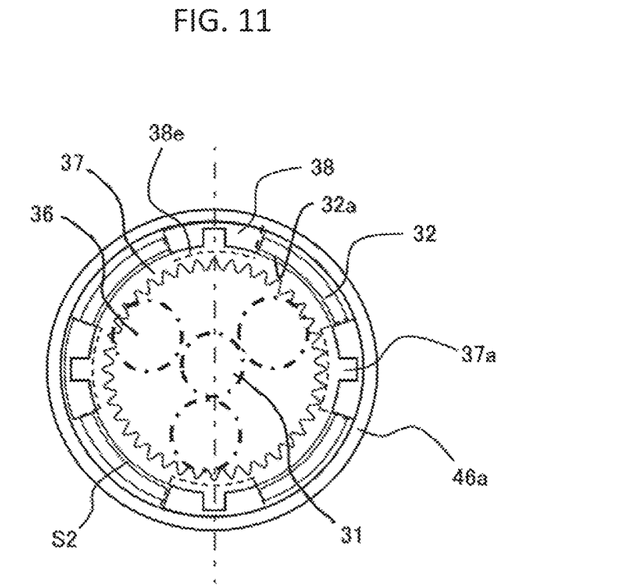
FIG. 11 is a main portion schematic diagram showing a cross section along the line A-A in FIG. 10.
Figure 12:
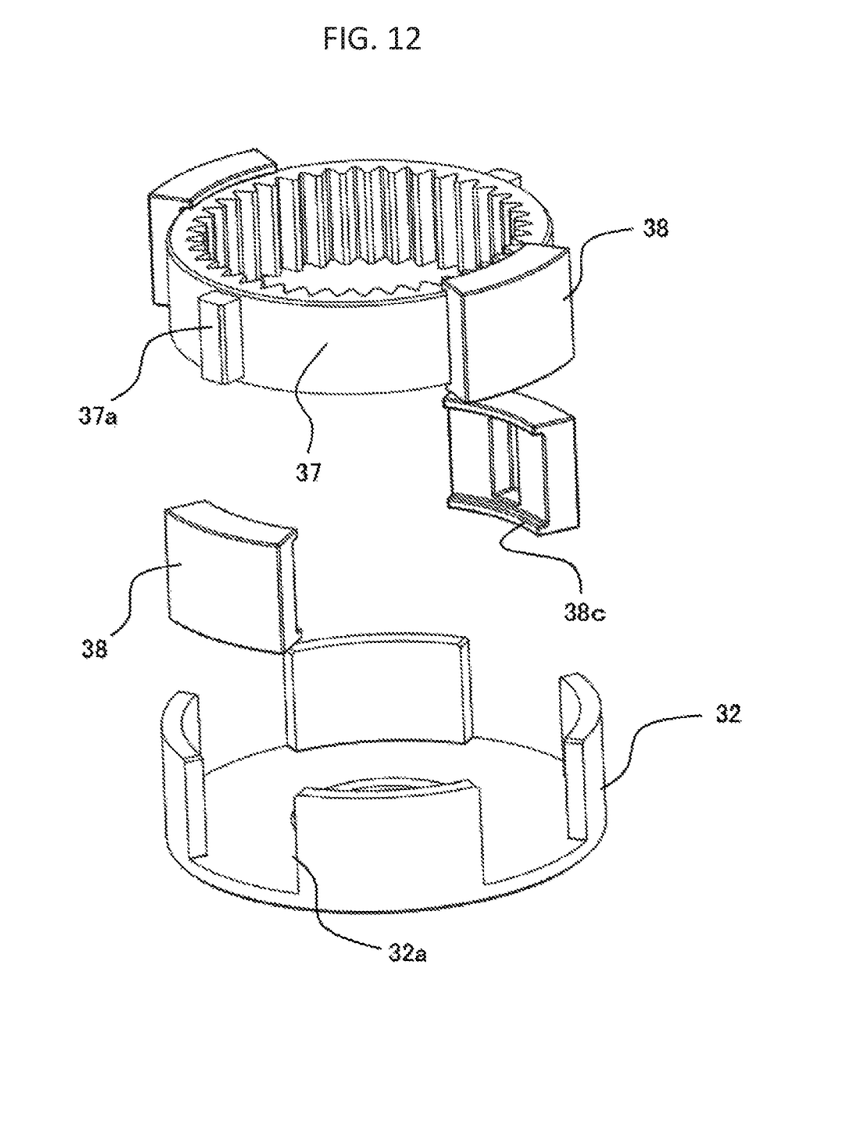
FIG. 12 is a schematic diagram showing in development the main portion configuration in FIG. 11.

FIG. 10 is a partial sectional view showing a configuration of an internal-combustion engine starting device according to the fourth embodiment, FIG. 11 is a main portion schematic diagram showing a cross section along the line A-A in FIG. 10, and FIG. 12 is a schematic diagram showing in development the main portion configuration in FIG. 11.

In the drawings, portions identical or equivalent to those of the configuration of the second embodiment shown in FIGS. 4 to 6 are given the identical signs, omitting the description.

In the fourth embodiment, a pair of projecting portions 38e are provided on each of the elastic bodies 38 so as to pinch therebetween both axial end faces of the internal gear 37, and thereby it is possible, even in a kind of case where the internal gear 37 inclines, to reliably prevent the internal gear 37 from coming into contact with the machine casing of the transmission mechanism section 30.

In the heretofore described first to fourth embodiments, a description has been given of the internal-combustion engine starting device wherein four protruding portions 37a of the internal gear 37 are provided at regular intervals, and are formed so as to fit in the respective elastic bodies 38, and wherein three planetary gears 36 are provided, but unless one of the number of internal gears 37 or the number of planetary gears 36 is a multiple of the other, it is possible to mitigate the amount of deformation of the internal gear 37 at the time of torque transmission, and also possible to reduce the clearance S1, clearance S2, and clearance S3.

Also, even though the protruding portions 37a of the internal gear 37 are disposed at irregular intervals instead of at regular intervals, it is possible, in the same way as heretofore mentioned, to mitigate the amount of deformation of the internal gear 37 at the time of torque transmission.

Furthermore, although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

INDUSTRIAL APPLICABILITY

The internal-combustion engine starting device disclosed in the present application can mitigate an impact force generated in the transmission mechanism section when starting, and so is useful for a vehicle, or the like, which requires noise reduction.

REFERENCE SIGNS LIST

10: switch section, 20: motor section, 22: partition wall, 30: transmission mechanism section, 40: output section, 31: pinion, 32: bracket, 33: bearing, 34: flange, 35: shaft, 36: planetary gear, 37: internal gear, 37a: protruding portion, 38: elastic body, 46: bracket, S1: axial clearance, S2: radial clearance, S3: radial clearance

The invention claimed is:

1. An internal-combustion engine starting device, comprising:
a switch section having a switch which is closed by a moving contact moving and being connected to a fixed contact by energization;

a motor section which operates by being energized by the closure of the switch;

a transmission mechanism section which reduces the rotation speed of the motor section; and a pinion gear section which has a pinion gear, which is caused to move axially by operation of the switch section and to which the output of the transmission mechanism section is transmitted, and which thus causes the pinion gear to engage with a ring gear connected to an internal-combustion engine, wherein the transmission mechanism section is configured of a planetary gear train including a pinion which is connected to the rotating shaft of the motor section, a plurality of planetary gears to which the rotation of the pinion is transmitted, and an internal gear which receives the rotation of the planetary gears; and the transmission mechanism is further configured of a machine casing in which is housed the planetary gear train and which includes a first bracket and a second bracket, elastic bodies are each fitted between a protruding portion formed on the outer peripheral surface of the internal gear and a recessed portion of the first bracket in which to receive the protruding portion, and clearances are formed between the internal gear and the first bracket via the elastic bodies and between the internal gear and the second bracket via the elastic bodies in a radial direction of the internal gear, and an outer surface of one of the elastic bodies, in the radial direction, is exposed from the recessed portion of the first bracket to an inner surface of the second bracket in the radial direction.

2. The internal-combustion engine starting device according to claim 1, wherein the clearances between the internal gear and the machine casing are configured to be larger than the gear clearance of the transmission mechanism section.

3. The internal-combustion engine starting device according to claim 1, wherein radial non-through holes are provided one in each of the elastic bodies, and the protruding portions of the internal gear are fitted one in each of the non-through holes.

4. The internal-combustion engine starting device according to claim 2, wherein radial non-through holes are provided one in each of the elastic bodies, and the protruding portions of the internal gear are fitted one in each of the non-through holes.

5. The internal-combustion engine starting device according to claim 3, wherein the radial thickness of the closed portion of the non-through hole in each of the elastic bodies is formed to be smaller than the clearances between the internal gear and the machine casing.

6. The internal-combustion engine starting device according to claim 4, wherein the radial thickness of the closed portion of the non-through hole in each of the elastic bodies is formed to be smaller than the clearances between the internal gear and the machine casing.

7. The internal-combustion engine starting device according to claim 1, wherein the circumferential length of one side of each of the elastic bodies, which side is subjected to a reaction force from the internal gear, is formed to be larger than that of the other side.

8. The internal-combustion engine starting device according to claim 2, wherein the circumferential length of one side of each of the elastic bodies, which side is subjected to a reaction force from the internal gear, is formed to be larger than that of the other side.

9. The internal-combustion engine starting device according to claim 3, wherein the circumferential length of one side of each of the elastic bodies, which side is subjected to a reaction force from the internal gear, is formed to be larger than that of the other side.

10. The internal-combustion engine starting device according to claim 4, wherein the circumferential length of one side of each of the elastic bodies, which side is subjected to a reaction force from the internal gear, is formed to be larger than that of the other side.

11. The internal-combustion engine starting device according to claim 5, wherein the circumferential length of one side of each of the elastic bodies, which side is subjected to a reaction force from the internal gear, is formed to be larger than that of the other side.

12. The internal-combustion engine starting device according to claim 6, wherein the circumferential length of one side of each of the elastic bodies, which side is subjected to a reaction force from the internal gear, is formed to be larger than that of the other side.

13. The internal-combustion engine starting device according to claim 1, wherein a pair of projecting portions which pinch therebetween the axial end faces of the internal gear are formed on each of the elastic bodies.

14. The internal-combustion engine starting device according to claim 2, wherein a pair of projecting portions which pinch therebetween the axial end faces of the internal gear are formed on each of the elastic bodies.

15. The internal-combustion engine starting device according to claim 3, wherein a pair of projecting portions which pinch therebetween the axial end faces of the internal gear are formed on each of the elastic bodies.

16. The internal-combustion engine starting device according to claim 4, wherein a pair of projecting portions which pinch therebetween the axial end faces of the internal gear are formed on each of the elastic bodies.

17. The internal-combustion engine starting device according to claim 1, wherein the elastic bodies are disposed in three or more portions, the number of which is not a multiple of the number of planetary gears.

18. The internal-combustion engine starting device according to claim 2, wherein the elastic bodies are disposed in three or more portions, the number of which is not a multiple of the number of planetary gears.

19. The internal-combustion engine starting device according to claim 17, wherein the elastic bodies are circumferentially disposed at irregular intervals.

20. The internal-combustion engine starting device according to claim 18, wherein the elastic bodies are circumferentially disposed at irregular intervals.

* * * * *